Oct. 2, 1928.                                                               1,685,786
A. T. POTTER
WORM DRIVE WINDSHIELD REGULATOR
Filed Feb. 4, 1927                3 Sheets-Sheet 1

INVENTOR
Albert T. Potter,
BY
ATTORNEYS

Oct. 2, 1928.
A. T. POTTER
1,685,786
WORM DRIVE WINDSHIELD REGULATOR
Filed Feb. 4, 1927   3 Sheets-Sheet 2
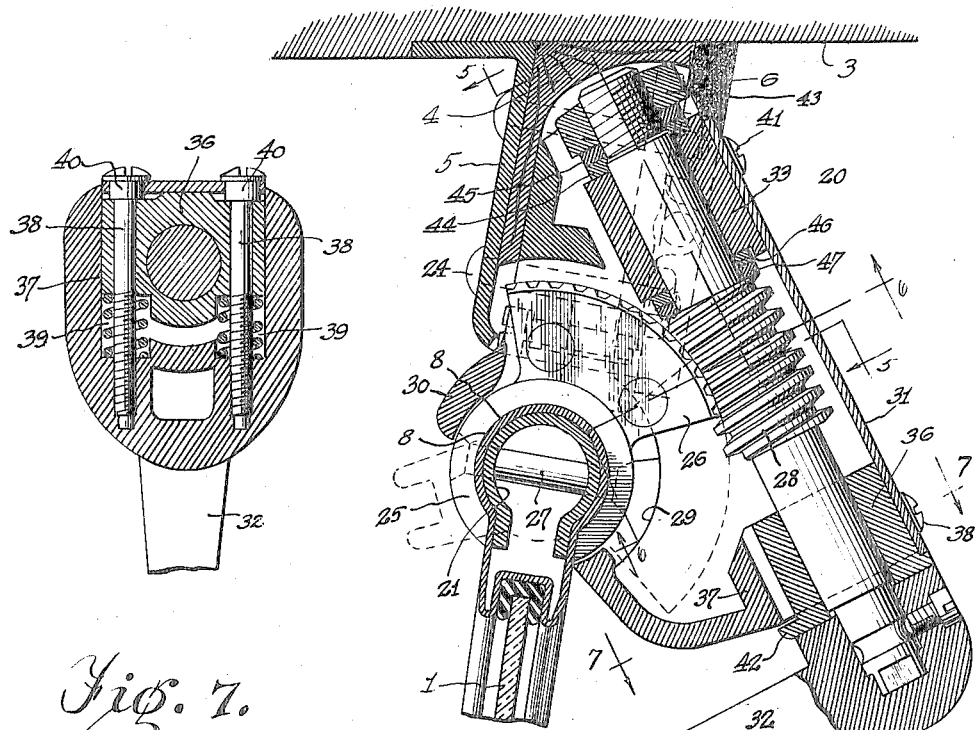
Fig. 4.
Fig. 7.
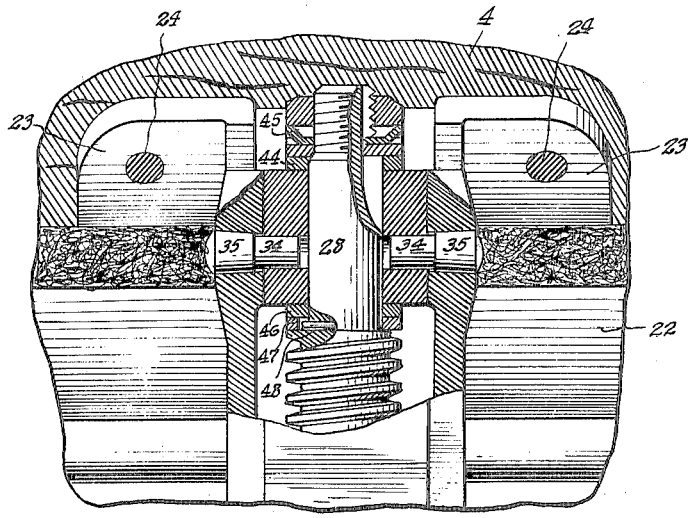
Fig. 5.
PROPRIETOR.
Albert T. Potter.
BY
ATTORNEYS

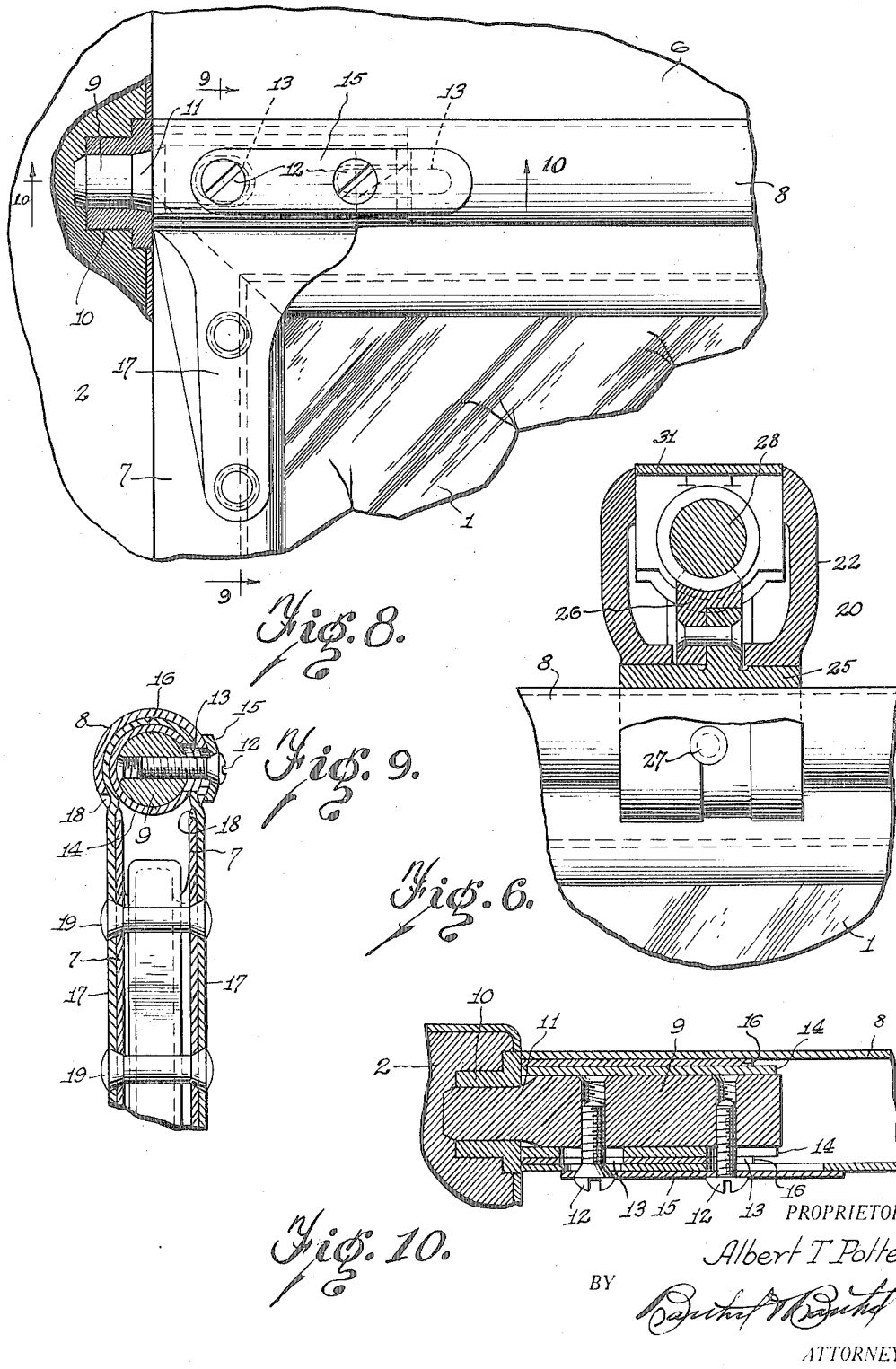

Patented Oct. 2, 1928.

1,685,786

UNITED STATES PATENT OFFICE.

ALBERT T. POTTER, OF DETROIT, MICHIGAN, ASSIGNOR TO AINSWORTH MANUFACTURING CO., OF DETROIT, MICHIGAN, A CORPORATION OF MICHIGAN.

WORM-DRIVE WINDSHIELD REGULATOR.

Application filed February 4, 1927. Serial No. 165,798.

This invention relates to windshields for motor vehicles and more particularly to means for pivotally supporting and adjustably swinging the panels of such devices. An object of the invention is to provide simple, compact and efficient means for adjusting a windshield panel through any desired degree of its swinging movement, and provide for convenient operation and unobstructed vision of the operator. A further object is to prevent vibration of the panel and consequent chattering, and to provide a positive smooth and easy movement thereof during adjustment. It is also an object to provide adjusting means in the form of a unit which may be quickly and easily connected in operative position and forms a strong, compact and rigid assembly providing accessibility for adjustment or repair. It is also an object to provide certain new and useful features in the construction and arrangement of a pivotal support for a windshield panel whereby accuracy of alinement and ease of operation are secured together with rigidity and facility of panel mounting.

With the above and other ends in view, the invention consists in the matters hereinafter set forth and more particularly pointed out in the appended claims, reference being had to the accompanying drawings in which Figure 1 is a perspective view of a device illustrative of the present invention and showing the same as applied in use to a motor vehicle;

Fig. 4 is an enlarged longitudinal section through the adjusting device and showing the same in operative position with the adjacent parts of the windshield panel and vehicle body enclosure to which the device is attached, also shown in section;

Fig. 5 is a sectional view substantially upon the line 5—5 of Fig. 4;

Fig. 6 is a section substantially upon the line 6—6 of Fig. 4;

Fig. 7 is a transverse section upon the line 7—7 of Fig. 4;

Fig. 8 is a detail of a pivotal support for a windshield panel showing parts broken away and in section;

Fig. 9 is a sectional detail substantially upon the line 9—9 of Fig. 8, and

Fig. 10 is a section upon the line 10—10 of Fig. 8.

Figure 1:
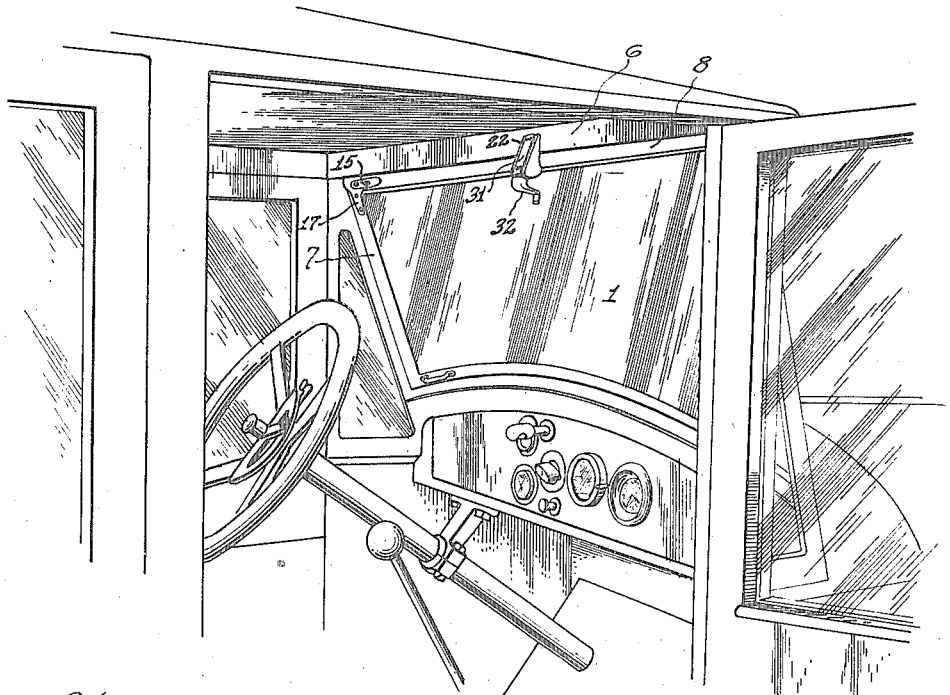
Figure 2:
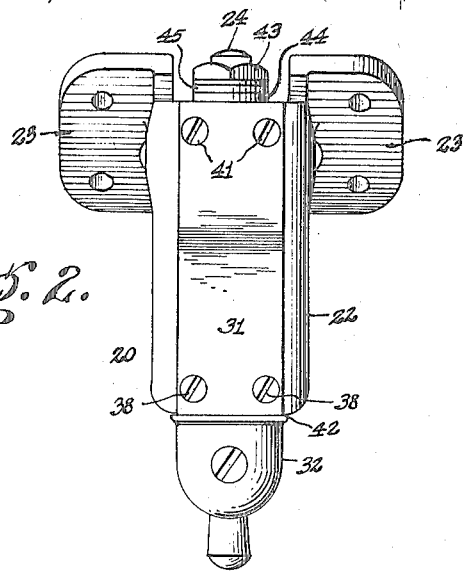
Fig. 2 is an elevation of a unitary adjusting device.
Figure 3:
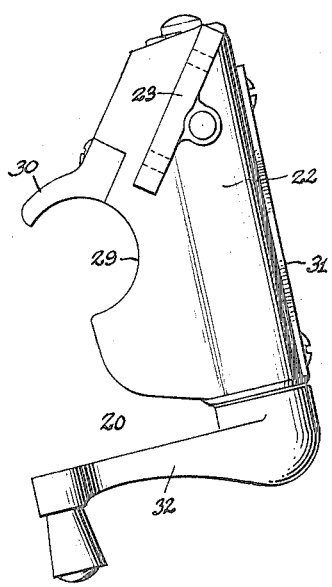
Fig. 3 is a side elevation of the device shown in Fig. 2.

The invention as shown, is applied to an automobile closed body, the windshield of which comprises a single glass panel 1 pivotally supported adjacent its upper corners to swing outwardly in the usual manner, but it will be understood that the invention may be applied as well to other forms and constructions of pivoted windshield panels, and to panels pivotally supported within the framing members of the body, as shown, or within a suitable rigid windshield frame as illustrated, the panel 1 is pivotally supported between the front corner members or posts 2 of the closed body which is provided with a fixed rigid top or roof 3 with a depending strip or header 4 connecting the upper ends of the posts and to which header the roof is secured by a transverse angle bar 5 forming the outer facing of the header. A finish strip 6 is secured to the inner face of the header to form a finish above the windshield to correspond with the interior finish of the body.

The glass panel 1 is inclosed within the usual metal frame including end channel members 7 and a top tubular member 8 which is also formed with the usual channel to receive the edge of the glass, and this frame and its glass panel is pivotally supported at its upper corners, between the posts 2 by means of pins 9 inserted in the ends of the tubular frame member 8, suitable metal bushings or sockets 10 being set in recesses in the inner faces of the posts to receive the ends of the pins, each pin being formed with a tapered portion or shoulder 11 to engage a like tapered portion of the bore of each socket member 10 so that when the pins are adjusted longitudinally their tapered portions 11 will engage the tapered portions of the bores to take the end thrust and prevent all side movement of the panel between the posts, at the same time permitting free pivotal movement of the panel. In order that the panel may be inserted between the posts and the pivot pins then adjusted longitudinally into their sockets to pivotally support the panel with comparatively little space between the ends of the panel frame and said posts and accurately center the panel frame therebetween to swing freely, and also provide for adjustment should these pivot pins become loose through wear or otherwise, each pin is adjustably secured within an end of the tubular member 8 by screws 12 passing through elongated slots 13 in the inner side wall of the tube 8 and through like slots in a tubular sleeve or bushing 14 for the pin inserted in the end of the tube 8, said screws thence extending into screw-threaded openings in the pin. To cover these slots, a thin outside plate 15 is provided with openings through which the screws extend, and thus by loosening the screws, the pins may be adjusted longitudinally when desirable and when so adjusted the screws may be tightened to firmly and rigidly hold the pins. This arrangement also provides for the retraction of the pins into the ends of the tubular frame member so that the panel may be inserted between the posts, and to provide a very rigid corner construction for the panel frame, a corner bracket member is provided having a semi-tubular portion 16 to fit within the end of the tubular member 8 between the sleeve 14 and the tube 8 and this bracket member is also formed with side legs 17 depending from its tubular portion 16, the frame member 8 being slotted as at 18 (see Fig. 8) so that these legs may be inserted through these slots to bring them upon the outer side of the frame member 7 where they are rigidly secured by the rivets 19 or other securing means, each of these corner brackets thus serving to rigidly unite the frame members 7 and 8 at the corners of the frame and brace these corners to make a very rigid frame for the glass panel without the necessity for welding or otherwise intimately uniting the ends of the frame member 8 to the ends of the frame members 7. Assembly of the glass panel within its frame is thus facilitated as the frame may be made up with the member 8 left off, the glass slipped into the frame through its open top side, and then the member 8 with its corner brackets slipped into place and the bracket legs riveted to the end frame members 7. This construction also facilitates the placing of a new glass in the frame should one be broken, it only being necessary to remove the rivets 19, which if desirable, may be in the form of screw bolts.

To swing the panel 1 upwardly and outwardly upon its pivotal support being the posts or body framing members 2, an operating device indicated as a whole by the numeral 20, is secured to the header 4, preferably intermediate the ends thereof and connected to the member 8 of the panel frame, said tubular member 8 being reinforced where the operating means is connected thereto, by inserting within the tubular post of said frame members 8, a reinforcing sleeve 21 (see Fig. 4).

The operating device 20 comprises a suitable casing 22 formed with lateral flanges or ears 23 by means of which said casing is rigidly secured to the inner side of the header 4 by bolts 24 passing through openings in said ears and openings in said header 4 and single bar 5, the header being cut away to receive the upper end of the casing and ears, and the finish strip 6 being cut to fit around and over the casing, concealing said ears. The said ears 23 are so positioned relative to the longitudinal axis of the casing, that when secured in place upon the header said casing will extend inwardly and downwardly from said header with its lower or inner end substantially in the horizontal plane of the upper edge of the panel 1. The operating device is therefore positioned above the windshield panel adjacent the roof of the body and intermediate the ends of the panel where it is out of the line of vision of the operator, and yet is conveniently positioned for manipulation by the operator.

Sleeved upon the tubular portion of the frame member 8 is a ring-shaped hub 25 to which is riveted or otherwise secured, a gear segment 26, said hub being rigidly secured to said frame member by a rivet 27 passing through the hub, tube and reinforcing sleeve 21 within the tube, and mounted within the casing 22 is a worm shaft 28 having a worm thread thereon to mesh with the teeth of the segment 26. The casing is formed at one side, as at 29, to receive the hub 25 and partly encircle the same and a cap 30 is detachably secured to the casing to fit over the upper part of said hub and close the opening into the casing through which the segment 26 is inserted in mounting the casing in place relative to the segment which is rigidly secured to the frame member 8 of the panel 1. The inner side of the casing opposite the worm shaft 28 is open to give access to the interior parts, and this open side is closed by a detachable plate 31.

When the shaft 28 is turned by means of a crank handle 32 secured in any suitable manner upon its inner end which projects from the inner or lower end of the casing 22, the panel 1 is swung upon its pivotal supports, outwardly, upwardly and forwardly and is held in its adjusted position by the engagement of the sector 26 with the worm shaft. When so swung and held, the panel tends to swing back to its position of rest and therefore the weight of the panel or this gravitating force is taken up by the worm shaft. If the teeth of the sector do not mesh perfectly with worm thread on the shaft, that is, if there be any lost motion or play, the windshield panel will vibrate and rattle during travel of the car. To provide for adjustment of the shaft relative to the sector so that perfect meshing of the worm thread with the teeth may be secured and maintained, said shaft is mounted in adjustable bearings in the casing 22 and these bearings so arranged as to provide for quick, convenient and accurate adjustment, the upper end of said shaft being mounted in a bearing block 33 pivotally supported at opposite sides upon trunnions each comprising a pin having a reduced end portion 34 to engage an opening in the side of the block and a tapered head 35 to engage a tapered opening in the side wall of the casing, said heads of said pins frictionally engaging said openings to hold the pins against turning. The shaft is thus free to swing toward and from the sector 26 to adjust the engagement of its worm thread with the teeth of the sector. At the opposite or inner end of the casing the inner end of the shaft is mounted in a bearing block 36 mounted in a guideway 37 formed by the end wall of the casing, the depth of the guideway being greater than that of the block to provide for movement of the block therein as the shaft is swung upon the trunnions of the block 33, and to adjust the block 36 in its guide, screw bolts 38 (see Fig. 7) pass through openings in the block to turn freely therein and screw-threaded at their iner ends to engage screwthreaded openings in the casing wall, springs 39 being sleeved upon these bolts between the bottom of the guideway 37 and the lower side of the bearing block to hold the block pressed upwardly and firmly against heads 40 on said bolts, and thus by screwing the bolts inwardly, the block 36 will be adjusted inwardly of said guideway or downwardly therein and swing the inner end of the shaft toward the sector. These same bolts 38 also serve to hold the cover plate 31 in place, it being held at its opposite end by screws 41 screwed into openings in the bearing block 33. To cover the outer open end of the guideway 37 and guide the block 36 in its movement, said block is formed with a flange 42 to overlie the end of the casing, and to prevent longitudinal movement of the shaft in its bearings the forward or upper end of the shaft which projects through the block 33 is screwthreader to receive a nut 43, a plain washer 44 being sleeved on the shaft to engage the block and a lock washer 45 being interposed between the nut and washer 44. Thrust washers 46 and 47 are sleeved upon the shaft between a shoulder thereon and the inner or lower end of the block 33 to take the end thrust of said shaft, said washer 47 being secured to the shaft by a pin 48 (see Fig. 5) to turn therewith so that said shaft will turn freely.

With the arrangement of operating device shown, the casing of said device is positioned near the roof of the body where it is out of the way yet handy for operation, the operating handle being near the upper edge of the windshield at the center thereof but out of the line of vision of the operator. Further, this construction permits the shifting of the windshield in the knockdown and the ready assembly of the operating device with the shield and in place on the automobile, by an unskilled workman. Perfect meshing of the worm with the sector is secured through the ready adjustment of the worm, thus insuring against rattling and vibration of the windshield panel and a very compact, strong and rigid construction is secured. Assembly of the windshield panel in its supports on the body is also facilitated and accuracy secured through the particular construction of pivotal support and all lateral play between pivot members may be readily taken up at any time.

Obviously, changes may be made in the construction and arrangement of parts, within the scope of the appended claims and I do not limit myself to the particular construction shown.

What I claim is:—

1. The combination with the frame of a vehicle body formed to receive and support a windshield, of a windshield panel pivotally supported at its ends between upwardly extending members of said body frame, and means for swinging said panel including a casing rigidly secured to the frame above and intermediate the ends of said panel, a member secured to the panel intermediate its ends and within said casing, said casing being formed with an opening to receive said member, a closure for said opening detachably secured to said casing, a shaft in said casing to operate said member, said shaft being inclined inwardly and downwardly from the support of said casing, and an operating handle on the inner end of said shaft for manually rotating the shaft, said handle being in substantially the horizontal plane of the upper portion of the panel.

2. The combination of a windshield panel having an upper horizontally disposed frame member pivotally mounted at its ends, and means for swinging said panel upon its pivotal supports, said means including a fixed casing having an opening therein, a worm gear segment secured to said panel frame member to turn therewith and projecting through said opening into said casing, a detachable closure for said opening formed to partially embrace said frame member, a worm shaft in said casing having a thread to engage the teeth of said segment, means forming bearings for the ends of said shaft and one of which bearings is adjustable to vary the mesh of said segment and worm, means for yieldingly supporting said adjustable bearing in the casing, means for adjusting said adjustable bearing against the action of said yielding means, and means on the rear end portion of the shaft for turning the same.

In testimony whereof I affix my signature.

ALBERT T. POTTER.